United States Patent
Bhandari et al.

(10) Patent No.: US 8,349,933 B2
(45) Date of Patent: Jan. 8, 2013

(54) SILICONE POLYIMIDE COMPOSITIONS WITH IMPROVED FLAME RETARDANCE

(75) Inventors: Yashpal J. Bhandari, Evansville, IN (US); Robert Russell Gallucci, Mt. Vernon, IN (US)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 377 days.

(21) Appl. No.: 12/840,802

(22) Filed: Jul. 21, 2010

(65) Prior Publication Data

US 2012/0021153 A1  Jan. 26, 2012

(51) Int. Cl.
 *C08G 77/455* (2006.01)
 *C08L 83/10* (2006.01)
 *C08L 79/08* (2006.01)

(52) U.S. Cl. ........ 524/422; 525/100; 525/186; 525/199; 525/426; 525/431

(58) Field of Classification Search .................. 525/422, 525/100, 186, 199, 426, 431
See application file for complete search history.

(56) References Cited

U.S. PATENT DOCUMENTS

| 3,325,450 | A |   | 6/1967  | Holub |
|-----------|---|---|---------|-------|
| 3,833,546 | A |   | 9/1974  | Takekoshi et al. |
| 3,847,867 | A |   | 11/1974 | Heath et al. |
| 4,011,279 | A |   | 3/1977  | Berger et al. |
| 4,051,163 | A |   | 9/1977  | Berger |
| 4,404,350 | A |   | 9/1983  | Ryang |
| 4,690,997 | A |   | 9/1987  | Cella et al. |
| 4,808,686 | A |   | 2/1989  | Cella et al. |
| 5,028,681 | A |   | 7/1991  | Peters |
| 5,104,958 | A |   | 4/1992  | Bolon et al. |
| 5,106,915 | A | * | 4/1992  | Rock et al. ..................... 525/431 |
| 5,681,875 | A |   | 10/1997 | Huang et al. |
| 5,804,654 | A |   | 9/1998  | Lo et al. |
| 7,259,201 | B2 |  | 8/2007  | Gallucci et al. |
| 7,652,107 | B2 |  | 1/2010  | Gallucci et al. |
| 2007/0299215 | A1 | | 12/2007 | Banerjee et al. |
| 2008/0223602 | A1 | | 9/2008  | Gallucci et al. |

FOREIGN PATENT DOCUMENTS

EP  846729 A2 *  6/1998

* cited by examiner

*Primary Examiner* — Kelechi Egwim

(74) *Attorney, Agent, or Firm* — Novak Druce + Quigg LLP; Diderico van Eyl

(57) ABSTRACT

A flame retardant composition and method for making flame retardant articles. The flame retardant composition can include a silicone polyetherimide, an fibrillated polytetrafluoroethylene, and a zinc borate. The silicone polyetherimide can be present in an amount of from about 99.6 to about 80.0 percent by weight. The silicone polyetherimide can have from about 5 to about 50 percent by weight dimethyl siloxane units, and less than about 100 ppm amine end groups. The fibrillated polytetrafluoroethylene can be present in an amount of from more than about 1.25 to about 5.0 percent by weight. The fibrillated polytetrafluoroethylene can be encapsulated in a polystyrene, a poly(styrene acrylonitrile), a poly (methyl methacrylate), a polycarbonate, a polyetherimide, a polysulfone, and combinations thereof. The zinc borate can be present in an amount of more than 0 to about 10 percent by weight.

30 Claims, No Drawings

SILICONE POLYIMIDE COMPOSITIONS WITH IMPROVED FLAME RETARDANCE

FIELD

The following relates to silicon polyimide compositions and more particularly to silicone polyimide compositions with improved flame retardance.

BACKGROUND

Engineering thermoplastics are used for the construction of many components in planes, trains, and automobiles. To improve survivability during accidents, it is important that the engineering thermoplastics meet various flammability performance standards.

A need exists, therefore, for an engineering thermoplastic characterized by high impact strength, good blow-moldability, good injection moldability, amenability to thermoforming, and very low flammability. In particular, it would be desirable to provide silicone polyimide compositions with improved flame retardance.

SUMMARY

The invention relates to a flame retardant composition comprising:
(a) from about 99.6 to about 80.0 percent by weight silicone polyetherimide, wherein the silicone polyetherimide has from about 5 to about 50 percent by weight dimethyl siloxane units, and less than about 100 ppm amine end groups;
b) from more than about 1.25 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof; and
c) more than 0 to about 10 percent by weight of a zinc borate.

In one embodiment, the invention relates to a method comprising:
forming a blend comprising:
 a) from about 99.6 to about 80.0 percent by weight silicone polyetherimide, wherein the silicone polyetherimide has from about 5 to about 50 percent by weight dimethyl siloxane units, and less than about 100 ppm amine end groups,
 b) from about 0.3 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof, and
 c) more than 0 to about 10 percent by weight of a zinc borate; and
mixing the blend to form an extrudate.

In another embodiment, the invention relates to a flame retardant composition, having a flame spread index as determined by ASTM E 162, on a 3.2 mm sample, of less than 35, and having a tensile strength at yield as determined by ASTM D638, on a 3.2 mm sample at 50 mm/min crosshead speed, from 2,000 to 8,000 psi, the flame retardant composition comprising:
a) from about 99.6 to about 80.0 percent by weight silicone polyetherimide, wherein the silicone polyetherimide has from about 5 to about 50 percent by weight dimethyl siloxane units, a weight average molecular weight from about 5,000 to about 70,000 Daltons, and less than about 100 ppm amine end groups;
b) more than about 1.25 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof;
c) more than 0 to about 10 percent by weight of a zinc borate with a particle size of from about 1 to about 10 microns, having less than about 1000 ppm cadmium, mercury or lead;
d) 0 to 5 wt % of a metal oxide selected from the group of titanium dioxides, silicone dioxides, zinc oxides, antimony oxides or mixtures thereof, wherein the metal oxide has particle size of 0.1 to 5 microns; and
e) less than 1000 ppm bromine or chlorine.

In another embodiment, the invention relates to articles comprising compositions of the invention.

These and other features, aspects, and advantages will become better understood with reference to the following description and appended claims.

DETAILED DESCRIPTION

The invention is based on the discovery that that it is now possible to make compositions exhibiting improved flame retardancy, low smoke, and high impact strength by using certain combinations of silicone polyetherimides, zinc borate, and fibrillated polytetrafluoroethylenes encapsulated with a copolymer provide. Advantageously, the blends pass the ASTM E 162 test method (a Standard Test Method for Surface Flammability of Materials Using a Radiant Heat Energy Source) and can exhibit reduced flame dripping, which retards the spread of fire, and can give off smoke that is essentially free of bromo and chloro compounds, which provides low corrosivity.

All numeric values are herein assumed to be modified by the term "about," whether or not explicitly indicated. The team "about" generally refers to a range of numbers that one of skill in the art would consider equivalent to the recited value (i.e., having the same function or result). In many instances, the term "about" may include numbers that are rounded to the nearest significant figure. Numerical ranges include all values within the range. For example, a range of from 1 to 10 supports, discloses, and includes the range of from 4.5 to 9.7. Similarly, a range of at least 10 supports, discloses, and includes the range of at least 15.

Thus, the following disclosure describes silicone polyimide compositions with improved flame retardance. Many other examples and other characteristics will become apparent from the following description.

As introduced above, flame retardant compositions can include a silicone polyetherimide, a fibrillated polytetrafluoroethylene, and a zinc borate.

The composition can have a flame spread index as determined by ASTM E162, on a 3.2 mm sample, of less than 35.

The composition can have a tensile elongation at break, as determined by ASTM D638, of greater than 25%.

The composition can have a tensile strength at yield, as determined by ASTM D638, on a 3.2 mm sample at 50 mm/min crosshead speed, of greater than or equal to 2,000 psi, or of from 2,000 to 8,000 psi.

The silicon polyetherimide can be any silicon-containing polyetherimide, which when used in accordance with the invention, enables the composition to exhibit a useful combination of improved flame retardancy, low smoke, and high impact strength properties, such that the compositions can pass the ASTM E 162 Standard Test Method for Surface Flammability of Materials Using a Radiant Heat Energy Source. Siloxane polyimide copolymers are a specific silicon polyetherimide that may be used in the blends of this invention. Examples of such siloxane polyimides are described in U.S. Pat. Nos. 5,028,681, 4,808,686, 4,690,997, 4,404,350, 4,051,163, 4,011,279, 3,847,867, 3,833,546 and 3,325,450. Siloxane polyimides can be prepared by standard methods to make polyimides wherein at least a portion, generally from 5 to 70 wt. %, and optionally from 10 to 50 wt. %, of the imide is derived from siloxane containing diamines, siloxane containing dianhydrides or chemical equivalents thereof. Such siloxane polyimides include SILTEM* resins, which can be obtained from SABIC Innovative Plastics (*Trademark of SABIC Innovative Plastics).

The siloxane polyimide can be prepared by any of the methods known to those skilled in the art, including the reaction of an aromatic bis(ether anhydride) of the Formula 1,

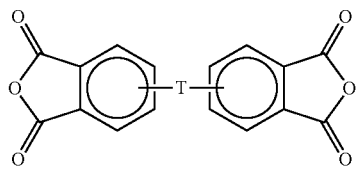

Formula 1 with an organic diamine of the Formula 2,

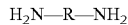

Formula 2 wherein T is a divalent moiety selected from the group consisting of —O—, —S—, —C(O)—, $SO_2$—, —SO—, a direct linkage, a fused ring linkage, or a group of the formula —O—Z—O— wherein the divalent bonds of the -T- or the —O—Z—O— group are in the 3,3', 3,4', 4,3', or the 4,4' positions, and wherein Z includes, but is not limited, (a) aromatic hydrocarbon radicals having about 6 to about 36 carbon atoms and halogenated derivatives thereof including perfluoroalkylene groups; (b) straight or branched chain alkylene radicals having about 2 to about 24 carbon atoms (c) cycloalkylene radicals having about 3 to about 20 carbon atoms, or (d) divalent radicals of the general Formula 3:

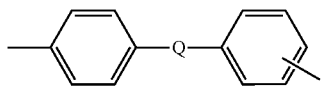

Formula 3 wherein Q includes but is not limited to a divalent moiety selected from the group consisting of —O—, —S—, —C(O)—, —$SO_2$—, —SO—, —$C_yH_{2y}$— (y being an integer from 1 to 8), and fluorinated derivatives thereof, including perfluoroalkylene groups, and wherein at least a portion of the reactants, either dianhydride, diamine, or mixtures thereof, contain a siloxane functionality. The moiety R in Formula 2 includes but is not limited to substituted or unsubstituted divalent organic radicals such as: (a) aromatic hydrocarbon radicals having about 6 to about 36 carbon atoms and halogenated derivatives thereof; (b) straight or branched chain alkylene radicals having about 2 to about 20 carbon atoms (c) cycloalkylene radicals having about 3 to about 24 carbon atoms, or (d) divalent radicals of the general Formula 3.

Examples of suitable diamine compounds are ethylenediamine, propylenediamine, trimethylenediamine, decamethylenediamine, 1,12-dodecanediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3, 5-diethylphenyl) methane, bis(4-aminophenyl)propane, 2,4-bis(p-amino-t-butyl)toluene, bis(p-amino-t-butylphenyl) ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis (4-aminophenyl)ether and 1,3-bis(3-aminopropyl)benzene. Mixtures comprising at least one of the foregoing compounds may also be used. In some embodiments, diamino compounds are aromatic diamines, especially m- and p-phenylenediamine, sulfonyl dianilines, bis aminophenoxy benzenes, bis amino phenoxy sulfones and mixtures comprising at least one of the foregoing diamines.

Examples of specific aromatic bis anhydrides and organic diamines are disclosed in U.S. Pat. Nos. 3,972,902 and 4,455,410. Illustrative examples of aromatic bis anhydrides include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl] propane dianhydride; 4,4'-bis(2,3-dicarboxyphenoxy)diphenyl ether dianhydride; 4,4'-bis(2,3-dicarboxyphenoxy) diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2, 2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, pyromellitic dianhydride, biphenyl dianhydride, oxy diphthalic anhydride, sulfone diphthalic anhydride, hydroquinone diphthalic anhydride, resorcinol diphthalic anhydride and mixtures comprising at least one of the foregoing compounds.

The polyimide siloxanes can also be prepared in a manner similar to that used for polyimides, except that a portion, or all, of the organic diamine reactant is replaced by an amine-terminated organo siloxane, for example of the Formula 4 wherein g is an integer from 1 to about 100, optionally from about 5 to about 50, and R' is an aryl, alkyl or aryl alley group of from 2 to 20 carbon atoms.

Formula 4

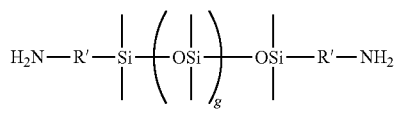

Some polyimide siloxanes may be formed by reaction of an organic diamine, or mixture of diamines, and the amine-terminated organo siloxane of Formula 4, and one or more dianhydrides. The diamino components may be physically mixed prior to reaction with the bis-anhydride(s), thus forming a substantially random copolymer. Alternatively block or alternating copolymers may be formed by selective reaction of 4 with dianhydrides to make polyimide blocks that are subsequently reacted together. In another instance the siloxane used to prepare the polyimide copolymer may have anhydride rather than amine functional end groups, for example as described in U.S. Pat. No. 4,404,350.

In another embodiment the siloxane polyimide copolymer can be of Formula 5 wherein T, R' and g are described as above, n is from 5 to about 100 and Ar is an aryl or alkyl aryl group of from 6 to 36 carbons.

drides and/or diamines wherein at least a portion of the dianhydride or the diamine contains an aryl sulfone linkage. In some instances both the diamine and dianhydride will contain an aryl ether linkage or an aryl sulfone linkage and at least a portion of the diamine or dianhydride will contain siloxane functionality, for example as described above. In other embodiments the aryl ether linkage can de derived from dianhydrides such as sulfone diphthalic anhydride, diphenyl sulfone diphthalic anhydride or mixtures thereof. In still other siloxane polyetherimide sulfones the aryl ether linkages can be derived from at least one diamine containing a aryl sulfone linkages, for example, diamino diphenyl sulfones (DDS), his amino phenoxy phenyl sulfones (BAPS) or mixtures thereof. Either the diamine or dianhydride may have an aryl sulfone linkage or in some instances both monomers may also contain aryl sulfone linkages.

The silicon polyetherimide can generally be present at from about 99.6 to about 80.0, or from about 95 to about 85, or more from about 90 percent by weight based on the total weight of the flame retardant composition.

The silicone polyetherimide can have from about 5 to about 50, from about 10 to about 40, or from about 20 to about 30 percent by weight dimethyl siloxane units.

Formula 5

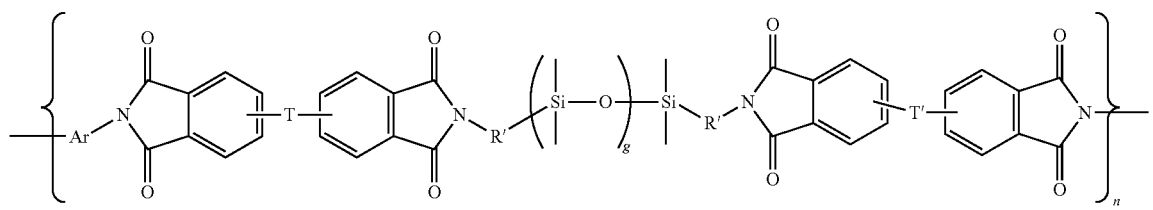

In some siloxane polyetherimides the diamine component of the siloxane polyetherimide copolymers may contain from about 5 to 70 wt. % of the amine-terminated organo siloxane of Formula 4 and from about 30 to 95 wt. % of the organic diamine of Formula 2. In some siloxane copolymers, the siloxane component contains from about 25 to about 40 wt. % of the amine or anhydride terminated organo siloxane.

In some embodiments the siloxane polyimides can be siloxane polyetherimides which contain aryl ether linkages that can be derived by polymerization of dianhydrides and/or diamines wherein at least a portion of the dianhydride or the diamine contains an aryl ether linkage. In some instances both the diamine and dianhydride will contain an aryl ether linkage and at least a portion of the diamine or dianhydride will contain siloxane functionality, for example as described above. In other embodiments the aryl ether linkage can de derived from dianhydrides such as bisphenol A diphthalic anhydride, biphenol diphthalic anhydride, oxy diphthalic anhydride or mixtures thereof. In still other siloxane polyetherimides the aryl ether linkages can be derived from at least one diamine containing an aryl ether linkages, for example, diamino diphenyl ethers, bis amino phenoxy benzenes, his amino phenoxy phenyl sulfones or mixtures thereof. Either the diamine or dianhydride may have aryl ether linkages or in some instances both monomers may contain aryl ether linkages.

In some other embodiments the siloxane polyimide will be a siloxane polyetherimide sulfone and can contain aryl sulfone linkages and aryl ether linkages. Sulfone linkages may be introduced into the polymer by polymerization of dianhy- The silicone polyetherimide can have less than about 100, less than about 75, or from 10 to about 50 ppm amine end groups;

The silicone polyetherimide can have a weight average molecular weight from about 5,000 to about 70,000, from about 10,000 to about 60,000, or from about 20,000 to about 50,000 Daltons.

The encapsulated polytetrafluoroethylene can be present at from more than about 1.25 to about 5.0, from about 1.5 to about 4.0, or from about 1.8 to about 2.0 percent by weight of the flame retardant composition. In particular, the encapsulated polytetrafluoroethylene can be present at about 1.5 percent by weight of the flame retardant composition.

The encapsulated polytetrafluoroethylene can be present at from 30 to 60, or from 40 to 50 percent by weight based on the total weight of the encapsulating polymer.

The fibrillated polytetrafluoroethylene can be encapsulated in a component selected from the group of: a polystyrene, a poly(styrene acrylonitrile), a poly(methyl methacrylate), a polycarbonate, a polyetherimide, a polysulfone, and combinations thereof.

The poly(styrene acrylonitrile) can have a weight average molecular weight of from about 100,000 to about 500,000, from about 200,000 to about 400,000, or about 300,000 Daltons, using polystyrene standards. The poly(styrene acrylonitrile) encapsulated PTFE has less than 3, less than 2, or from 0.5 to 1 percent weight loss when heated for 15 minutes at 150 degrees Celsius.

The thermoplastic compositions can further comprise from 0 to 2 wt. % of a fibrillated fluoropolymer, based on total weight of the composition. Suitable fluoropolymers include particulate fluoropolymers which can be encapsulated and which form a fibril, such as poly(tetrafluoroethylene) (PTFE).

The fluoropolymers are capable of being fibrillated ("fibrillatable") during mixing, individually or collectively, with the polyester. "Fibrillation" is a term of art that refers to the treatment of fluoropolymers to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment, the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers. Examples of suitable fluorinated monomers include and are not limited to alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations of the foregoing fluoropolymers can also be used.

Fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers can be made by coagulation and drying of dispersion-manufactured fluoropolymers. Fine powder fluoropolymers are generally manufactured to have a particle size of approximately 400 to 500 micrometers. "Granular" fluoropolymers can be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

Modulated differential scanning calorimetry (MDSC) methods can be used for determining extent of fibrillation of the fluoropolymer in the various compositions can be used to monitor the course and degree of fibrillation.

In one embodiment, the fluoropolymer is encapsulated by a rigid copolymer, e.g., a copolymer having a Tg of greater than 10° C. and comprising units derived from a monovinyl aromatic monomer and units derived from a $C_{3-6}$ monovinylic monomer.

Monovinylaromatic monomers include vinyl naphthalene, vinyl anthracene, and the like, and monomers of Formula 6:

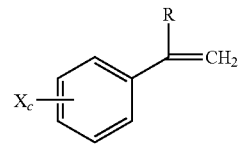

Formula 6 wherein each X is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, c is 0 to 5, and R is hydrogen, $C_1$-$C_5$ alkyl, bromo, or chloro. Exemplary monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and a combination comprising at least one of the foregoing compounds.

Monovinylic monomers include unsaturated monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the Formula 7:

Formula 7 wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (3) include acrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl(meth)acrylate, t-butyl(meth)acrylate, n-propyl(meth)acrylate, isopropyl(meth)acrylate, 2-ethylhexyl(meth)acrylate, and the like, and a combination comprising at least one of the foregoing monomers. Monomers such as n-butyl acrylate, ethyl acrylate, and 2-ethylhexyl acrylate are commonly used. Combinations of the foregoing monovinyl monomers and monovinylaromatic monomers can also be used.

In a specific embodiment, the monovinylic aromatic monomer is styrene, alpha-methyl styrene, dibromostyrene, vinyltoluene, vinylxylene, butylstyrene, or methoxystyrene, specifically styrene and the monovinylic monomer is acrylonitrile, methacrylonitrile, methyl(meth)acrylate, ethyl (meth)acrylate, n-propyl(meth)acrylate, or isopropyl(meth)acrylate, specifically acrylonitrile. A useful encapsulated fluoropolymer is PTFE encapsulated in styrene-acrylonitrile (SAN), also known as TSAN.

Encapsulated fluoropolymers can be made by polymerizing the encapsulating polymer in the presence of the fluoropolymer, for example an aqueous dispersion of the fluoropolymer. Alternatively, the fluoropolymer can be pre-blended with a second polymer, such as an aromatic polycarbonate or SAN to form an agglomerated material. Either method can be used to produce an encapsulated fluoropolymer. The relative ratio of monovinyl aromatic monomer and monovinylic comonomer in the rigid graft phase can vary widely depending on the type of fluoropolymer, type of monovinylaromatic monomer(s), type of comonomer(s), and the desired properties of the composition. The rigid phase can comprise 10 to 95 wt. % of monovinyl aromatic monomer, specifically about 30 to about 90 wt. %, more specifically 50 to 80 wt. % monovinylaromatic monomer, with the balance of the rigid phase being comonomer(s). The SAN can comprise, for example, about 75 wt. % styrene and about 25 wt. % acrylonitrile based on the total weight of the copolymer. An exemplary TSAN comprises about 50 wt. % PTFE and about 50 wt. % SAN, based on the total weight of the encapsulated fluoropolymer.

The fibrillated fluoropolymer can be used in amounts, based on the total weight of the thermoplastic composition, from 0 to 2 wt. %, and more particularly from 0.1 to 2.0 wt %, and even more particularly from 0.1 to 1.0 wt % of the composition. In one embodiment, the fibrillated fluoropolymer is a polymer encapsulated fibrillated fluoropolymer comprising fibrillated poly(tetrafluoroethylene) encapsulated with styrene-acrylonitrile and is present in an amount ranging from 0.1 to 1.0 wt. %.

The zinc borate can be present in an amount of more than 0 to about 10, from 1 to 9, from 2 to 8, from 3 to 7, from 4 to 6, or 5 percent by weight of a zinc borate.

The zinc borate can be selected from the group of: anhydrous zinc borate, zinc borate mono hydrate, and mixtures thereof.

The zinc borate can have a particle size from about 1 to about 10, from 2 to 9, from 3 to 8, from 4 to 7, or from 5 to 6 microns.

The zinc borate can have less than about 1000, less than about 900, less than 800, or from 100 to 500 ppm cadmium, mercury, or lead.

The zinc borate can be a calcined zinc borate. The calcined zinc borate preferably should have no water evolved when heated to 350 degrees Celsius.

The flame retardant composition can also include a metal oxide.

The metal oxide can be present in an amount of from more than 0 to about 10, from 1 to 9, from 2 to 8, from 3 to 7, from 4 to 6, or 5 percent by weight based on the total weight of the flame retardant composition.

The metal oxide can be selected from the group of: a titanium dioxide, a silicone dioxide, a zinc oxide, an antimony oxide, and combinations thereof.

The metal oxide can have a particle size of from about 0.1 to about 5, from about 0.5 to about 4, from about 1 to about 3, or about 2 microns.

The flame retardant composition can have less than about 1000, less than about 900, less than about 800, or from 500 to 700 ppm bromine and less than about 1000, less than about 900, less than about 800, or from 500 to 700 ppm chlorine.

The flame retardant composition can also include a colorant. The colorant can be selected from the group of: ultramarine blue, phthalo-blue, phthalo-green solvent green 3, solvent green 28, solvent green 50, solvent blue 28, solvent blue 29, solvent blue 36, solvent red 52, solvent red 101, solvent red 151, solvent orange 63, solvent violet 13, solvent violet 36, solvent yellow 33, solvent yellow 53, solvent yellow 98, pigment red 179, pigment red 202, pigment brown 24, pigment brown 33 pigment green 7, carbon black, pigment blue 15:4, and combinations thereof.

A preferred flame retardant composition can both have a flame spread index as determined by ASTM E 162, on a 3.2 mm sample, of less than 35, and a tensile strength at yield as determined by ASTM D638, on a 3.2 mm sample at 50 mm/min crosshead speed, from 2,000 to 8,000 psi. A preferred flame retardant composition can include:

a) from about 99.6 to about 80.0 percent by weight silicone polyetherimide, wherein the silicone polyetherimide has from about 5 to about 50 percent by weight dimethyl siloxane units, a weight average molecular weight from about 5,000 to about 70,000 Daltons, and less than about 100 ppm amine end groups;
b) more than about 1.25 to about 5.0 percent by weight of a fibrillated polytetrafluoroethylene encapsulated in a component selected from the group of: a polystyrene, a poly (styrene acrylonitrile), a poly(methyl methacrylate), a polycarbonate, a polyetherimide, a polysulfone, and combinations thereof;
c) more than 0 to about 10 percent by weight of a zinc borate with a particle size of from about 1 to about 10 microns, having less than about 1000 ppm cadmium, mercury or lead;
d) 0 to 5 wt % of a metal oxide selected from the group of; titanium dioxides, silicone dioxides, zinc oxides, antimony oxides or mixtures thereof, wherein the metal oxide has particle size of 0.1 to 5 microns; and
e) less than 1000 ppm bromine or chlorine.

A method for forming a flame retardant composition can include forming a blend, mixing the blend to form an extrudate, cooling, pelletizing, drying the extrudate, and processing the extrudate to form a product. The product can be selected from the group of an injection molded product, a profile extruded product, a blow molded product, and combinations thereof. The blend can include a silicone polyetherimide, a fibrillated polytetrafluoroethylene, and a zinc borate. The silicone polyetherimide, the fibrillated polytetrafluoroethylene, and the zinc borate can have the properties and can be present in the amounts as already described. For example, the blend can include:

a) from about 99.6 to about 80.0 percent by weight silicone polyetherimide, wherein the silicone polyetherimide has from about 5 to about 50 percent by weight dimethyl siloxane units, and less than about 100 ppm amine end groups,
(b) from about 0.3 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof, and
c) more than 0 to about 10 percent by weight of a zinc borate.

The blend can be mixed in a twin-screw extruder at a die head temperature of from about 300 to about 350 degrees Celsius.

An article can include the flame retardant composition. The article can be at least one selected from the group of an injection-molded product, a profile extruded product, and a blow-molded product. For example, the article can be selected from the group of a tube, a profile, a housing for an injection molded product, a pipe, a conduit, and combinations thereof.

The article can also include a metal substrate, and a layer covering at least a portion of the substrate, wherein the layer comprises the flame retardant composition as already described. The substrate can be a component of an interior of a conveyance, such as a train, an airplane, a boat, a car, etc. For example, the substrate can be a component of an armrest.

Advantageously, our invention now provides compositions (and articles made from the compositions) exhibiting improved flame retardancy, low smoke, and high impact strength by using certain combinations of silicone polyetherimides, zinc borate, and fibrillated polytetrafluoroethylenes encapsulated with a copolymer provide. The blends can have reduced flame dripping, which retards the spread of fire, and can give off smoke that is essentially free of bromo and chloro compounds, which provides low corrosivity.

EXAMPLES

Although the present invention is described in considerable detail with reference to certain versions thereof, other versions are possible. This disclosure provides examples and aspects relating to various embodiments within the scope of claims, appended hereto or later added in accordance with applicable law. However, these examples are not limiting as to how the present disclosure may be implemented, as those of ordinary skill can apply these disclosures to particular situations in a variety of ways. Therefore, the spirit and scope of the appended claims should not be limited to the description of the exemplary versions contained herein.

Materials

Table 1 summarizes materials used in the examples.

TABLE 1

| Material | Description | Vendor |
|---|---|---|
| SILTEM* 1600 Resin "STM 1600" | SILTEM STM1600 contains about 26 percent by weight dimethyl siloxane polyetherimide copolymer; bisphenol A dianhydride, meta phenylene diamine polyetherimide copolymer with 26 percent by weight dimethyl siloxane units. The copolymer was end capped with phthalic anhydride and had an amine end group content of less than 10 parts per million (ppm) and a weight average molecular weight (Mw) of about 28,000. | SABIC Innovative Plastics |
| $ZnBO_4$ ($2ZnO \cdot 3B_2O_3$) | Firebrake ® 315, a 5 micron (μm) calcined zinc borate | Rio Tinto Borax |
| TSAN** | 50 percent by weight of a fibrillated polytetrafluoroethylene (PTFE) encapsulated in a high molecular weight (Mw = 225,000) styrene acrylonitrile (SAN) copolymer. | SABIC Innovative Plastics |

*Trademark of SABIC Innovative Plastics IP B.V.
**made by SABIC Innovative Plastics, as disclosed in U.S. Pat. No. 5,580,465

Techniques and Procedures

Various techniques and procedures will now be described. The techniques and procedures include composition preparation techniques, the ASTM E162 testing technique, and the UL-94 V0 testing technique.

Composition Preparation Techniques

The ingredients of the examples shown in Tables 2 and 3 below were tumble blended and then extruded on a 30 mm Werner Pfleiderer twin screw extruder with a vacuum vented mixing screw, at a barrel and die head temperature between 300 and 350 degrees Celsius and 250 to 300 revolution per minute (rpm) screw speed. The extrudate was cooled through a water bath prior to pelletizing. The compositions of the Examples were dried for 4 hours at 150 degrees Celsius and then injection molded into test parts at about 300 to 350 degrees Celsius on a 180 ton molding machine.

Comparative examples are designated by letters while numbers indicate examples illustrating embodiments of the invention.

TABLE 2

| Material | Example 1 | Example 2 | Example 3 | Example 4 | Example 5 |
|---|---|---|---|---|---|
| STM1600, % | 95.5 | 95.3 | 95.3 | 95.3 | 95.25 |
| Calcined $ZnBO_4$, % | 3.0 | 3.0 | 3.0 | 3.0 | 3.0 |
| TSAN, % | 1.5 | 1.8 | 2.0 | 1.5 | 1.5 |
| $TiO_2$, % | 0 | 0 | 0 | 0.4 | 0 |
| Macrolex Violet 3R, % | 0 | 0 | 0 | 0 | 0.11 |
| Sicotan Yellow K2001 FG, % | 0 | 0 | 0 | 0 | 0.012 |

TABLE 2-continued

| Material | Example 1 | Example 2 | Example 3 | Example 4 | Example 5 |
|---|---|---|---|---|---|
| Heliogen Blue K7100, % | 0 | 0 | 0 | 0 | 0.37 |

TABLE 3

| Material | Example A Comparative | Example B Comparative | Example C Comparative | Example D Comparative |
|---|---|---|---|---|
| STM1600, % | 100 | 96.5 | 96.0 | 95.75 |
| Calcined $ZnBO_4$, % | 0 | 3.0 | 3.0 | 3.0 |
| TSAN, % | 0 | 0.5 | 1.0 | 1.25 |
| $TiO_2$, % | 0 | 0 | 0 | 0 |

TABLE 3-continued

| Material | Example A Comparative | Example B Comparative | Example C Comparative | Example D Comparative |
|---|---|---|---|---|
| Macrolex Violet 3R, % | 0 | 0 | 0 | 0 |
| Sicotan Yellow K2001 FG, % | 0 | 0 | 0 | 0 |
| Heliogen Blue K7100, % | 0 | 0 | 0 | 0 |
| Carbon Black, % | 0 | 0 | 0 | 0 |

ASTM E162 Testing Technique

The ASTM E 162 technique used to test the injection-molded parts was conducted as indicated in the standard. The ASTM E 162 test method is a known laboratory test procedure for measuring and comparing the surface flammability of materials when exposed to a prescribed level of radiant heat energy. It is intended for use in measurements of the surface flammability of materials exposed to fire. An injection molded 30.5 cm×45.7 cm×3.2 mm thick molded part, conditioned for at least 2 days at 50% relative humidity, was supported at an angle of 30 degrees and exposed to a 13×18 inch radiant heat source capable of operating up to 1500 degrees Fahrenheit. The sample was burned and the rate and nature of flame spread was evaluated. A sample with a long burn rate, or that drips, fails the test. Reduced dripping is an important issue since in a fire flaming drips can spread the blaze causing more damage and/or limiting the escape of people from the fire. When a sample was deemed to pass, the sample was observed to have a flame spread index as determined by ASTM E 162, on a 3.2 mm sample, of less than 35 and showed no dripping.

UL-94 V0 Testing Technique

Parts were also tested for the UL-94 V0 flammability test. The UL-94 V0 test is a well-known test for evaluating the ignition resistance of plastics and involves exposing injection molded 1.75 cm×1.3 cm×1.6 mm thick parts, conditioned for at least 2 days at 50% relative humidity, to a small flame. For a rating of V0 a sample is placed so that its long axis is 180 degrees to the flame, after application of a small flame the individual sample flame time should not exceed ten seconds and none of the vertically placed samples should produce drips of burning particles that ignite absorbent cotton place under the sample. The average time that a set of 5 samples burns after two exposures to flame is the average flame out time (FOT) and is measured in seconds. Low flame out times (short burn times) show a better resistance to ignition. In addition the burned samples are also evaluated for a dripping. Flaming drips will reduce the UL-94 rating. The desired, higher rating is V-0, achieved when a material has no flaming drips and short flame out times indicating good resistance to ignition and lower probability of spreading the fire.

Results

Table 4 summarizes results obtained.

but not containing sufficient fibrillated polytetrafluoroethylene and the zinc borate did not pass the ASTM E162 test.

Discussion of Examples 1 to 5

More particularly, as shown in Table 4 in Examples 1 to 3, compositions containing STM1600 with more than about 1.25 percent by weight encapsulated polytetrafluoroethylene (TSAN; a 1:1 SAN styrene acrylonitrile encapsulated non-crystalline PTFE) with 3 percent by weight of a calcined, 5 micron particle size, zinc borate ($ZnBO_4$), passed the ASTM E162 and the UL-94 flame resistance tests, their respective performance showing a reduced average flame out time (FOT), better fire resistance and no dripping during burning.

Surprisingly, it was only when the composition contained more than about 1.25 percent by weight encapsulated fibrillated polytetrafluoroethylene, more particularly, at least about 1.5 percent by weight of encapsulated fibrillated polytetrafluoroethylene in combination with a small particle calcined zinc borate, that a robust ASTM E162 FR performance was achieved. Advantageously, in addition to passing the ASTM E162 surface flammability test the molded parts had good uniform part appearance with no splay or streaking.

The compositions of Examples 1 to 5 also pass the UL-94 V0 ignition resistance test at 1.6 mm and had good practical

TABLE 4

|  | Ex. A (Comp) | Ex. B (Comp) | Ex. C (Comp) | Ex. D (Comp) | Ex. 1 | Ex. 2 | Ex. 3 | Ex. 4 | Ex. 5 |
|---|---|---|---|---|---|---|---|---|---|
| STM1600, % | 100 | 96.5 | 96.0 | 95.75 | 95.5 | 95.3 | 95.3 | 95.3 | 95.25 |
| Calcined $ZnBO_4$, % | — | 3.0 | 3.0 | 3.0 | 3.0 | 3.0 | 3.0 | 3.0 | 3.0 |
| TSAN, % | — | 0.5 | 1.0 | 1.25 | 1.5 | 1.8 | 2.0 | 1.5 | 1.5 |
| $TiO_2$, % | 0 | 0 | 0 | 0 | 0 | 0 | 0 | 0.4 | |
| Macrolex Violet 3R, % | 0 | 0 | 0 | 0 | 0 | 0 | 0 | 0 | 0.11 |
| Sicotan Yellow K2001 FG, % | 0 | 0 | 0 | 0 | 0 | 0 | 0 | 0 | 0.012 |
| Heliogen Blue K7100, % | 0 | 0 | 0 | 0 | 0 | 0 | 0 | 0 | 0.37 |
| Carbon Black, % | 0 | 0 | 0 | 0 | 0 | 0 | 0 | 0 | 0.024 |
| ASTM E162- Surface Flammability | | | | | | | | | |
| Flame Spread Index (Is) *** | 15 | 6 | 4 | 4 | 6 | 6 | 5 | 4 | 4 |
| Dripping (Yes/No) | Y | Y | Y | Y | N | N | N | N | N |
| Comments | Continuous flaming dripping | 6 drips | Single drip | Single drip | No Dripping | No Dripping | No Dripping | No Dripping | No Dripping |
| ASTM E162 Pass/Fail | Fail | Fail | Fail | Fail | Pass | Pass | Pass | Pass | Pass |
| UL-94 Ignition Resistance | | | | | | | | | |
| Flame Out Time sec. ** | >15 s | <10 s | <10 s | <10 s | <8 s | <8 s | <8 s | <8 s | <8 s |
| Dripping (Yes/No) | Y | N | N | N | N | N | N | N | N |

Parts showed uniform part appearance with no splay or streaking, had good practical impact strength with a tensile elongation at break, as per ASTM D638 of greater than 25% and a tensile strength at yield of 2,000 psi or greater.
Samples 1 to 5 have a UL-94 V0 test rating at 1.6 mm.
A passing sample was observed to have a flame spread index as determined by ASTM E 162, on a 3.2 mm sample, of less than 35 with no dripping.

DISCUSSION

The results, as evident in Examples 1 to 5, showed that the use of from about 99.6 to about 80.0 percent by weight silicone polyetherimide having from about 5 to about 50 percent by weight dimethyl siloxane units, and less than about 100 ppm amine end groups in conjunction with (i) from more than about 1.25 to about 5.0 percent by weight of an encapsulated fibrillated polytetrafluoroethylene and (ii) more than 0 to about 10 percent by weight of a zinc borate resulted in compositions that passed the ASTM E162 and the UL-94 tests. The results, as evident in Comparative Examples A to D, also showed that compositions containing silicone polyetherimide impact strength with a tensile elongation at break, as per ASTM D638 of greater than 25% and a tensile strength at yield of greater than or equal to 2,000 psi.

In Examples 4 and 5, which contained 3.0 percent by weight of a 5 micron calcined zinc borate as well as the colorants: titanium dioxide ($TiO_2$), Marcolex Violet 3R (solvent violet 13), Sicotan Yellow K2001 fine grind (pigment brown 24), Heliogon Blue K7100 (pigment blue 15:4) and carbon black, the use of the silicone polyetherimide in conjunction with the encapsulated fibrillated polytetrafluoroethylene also gave reduced dripping, improved FR, and a passing rating in ASTM E162 test. The test parts were injection molded with a uniform smooth surface with no roughness or splay.

As such, the results show that the use of a calcined small particle size (less than 10 microns) zinc borate, when used in conjunction with the encapsulated fibrillated polytetrafluoroethylene, reduced the formation of surface imperfections, such as splay and streaking, during part molding. Examples of such specific calcined small particle size zinc borates are Firebrake® 500 and Firebrake® 315, commercially available from US Borax Co. a division of Rio Tinto Co. Our results suggest that other non-calcined zinc borates can lead to the generation of gas or decomposition giving a non-uniform surface with splay or streaking. Additionally large particle size zinc borates can also lead to poor tensile and impact strength and reduced elongation at break.

Discussion of Comparative Examples A to D

Our Comparative Example A showed that when the silicone polyetherimide was not used in conjunction with the encapsulated fibrillated polytetrafluoroethylene and the zinc borate, the resulting composition did not pass the ASTM E162 test. The results of showed that the indicated composition had continuous flaming dripping in the surface flammability (ASTM E162) test and did not pass the requirements for use in train interiors. More particularly initial work using Siltem silicone polyetherimide without the use of the encapsulated fibrillated polytetrafluoroethylene showed no reduction in flammability even when blended with 0.3 percent by weight potassium sulfone sulfonate or potassium perfluorobutyl sulfonate known flame-retardants for polyetherimide resins and polycarbonates.

In Comparative Examples B, C, and D, in which compositions contained 0.3 percent by weight calcined zinc borate and 0.5, 1.0 or 1.25 percent by weight encapsulated polytetrafluoroethylene (TSAN), respectively, we observed that while dripping was reduced it was not eliminated. The resulting compositions still failed the ASTM E 162 test, indicating that the relatively higher amounts of the TSAN are critical to the invention of a robust flame retardant material. However, if encapsulated polytetrafluoroethylene (TSAN) is used at too high a level (>10 percent by weight) the composition will show too much die swell and cannot easily be extruded into strands and cut into pellets for molding. Thus it is only the combination of; a specific dimethyl silicone polyetherimide, a critical amount of a fibular (fiber forming) non-crystalline encapsulated PTFE and a specific amount of a small particle calcined zinc borate, that meets the optimal performance requirements of; acceptable melt stability, good molded part appearance, high elongation and practical toughness as well as passing the demanding ASTM E162 and UL-94 flammability resistance requirements.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A flame retardant composition comprising:
   a) from about 99.6 to about 80.0 percent by weight silicone polyetherimide, wherein the silicone polyetherimide has from about 5 to about 50 percent by weight dimethyl siloxane units, and less than about 100 ppm amine end groups;
   b) from more than about 1.25 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof; and
   c) more than 0 to about 10 percent by weight of a zinc borate.

2. The composition of claim 1, having a flame spread index as determined by ASTM E 162, on a 3.2 mm sample, of less than 35.

3. The composition of claim 1, having a tensile strength at yield as determined by ASTM D638, on a 3.2 mm sample at 50 mm/min crosshead speed, from 2,000 to 8,000 psi.

4. The composition of claim 1, wherein the silicone polyetherimide has a weight average molecular weight from about 5,000 to about 70,000 Daltons.

5. The composition of claim 1, wherein the fibrillated polytetrafluoroethylene is encapsulated by poly(styrene acrylonitrile).

6. The composition of claim 5, wherein the poly(styrene acrylonitrile) has a weight average molecular weight of from about 100,000 to about 500,000 Daltons.

7. The composition of claim 5, wherein the poly(styrene acrylonitrile) has less than 3 percent weight loss when heated for 15 minutes at 150 degrees Celsius.

8. The composition of claim 5, wherein the encapsulated polytetrafluoroethylene is present at 30 to 60 percent by weight based on the total weight of component a).

9. The composition of claim 5, wherein the weight ratio of poly(styrene acrylonitrile) to polytetrafluoroethylene is 1:1.

10. The composition of claim 1, comprising from more than about 1.25 to about 5.0 percent by weight of component b).

11. The composition of claim 1, comprising about 1.5 percent by weight of component b).

12. The composition of claim 1, wherein the zinc borate is selected from the group of: anhydrous zinc borate, zinc borate mono hydrate, and mixtures thereof.

13. The composition of claim 1, wherein the zinc borate has a particle size from about 1 to about 10 microns.

14. The composition of claim 1, wherein the zinc borate has less than about 1000 ppm cadmium, mercury, or lead.

15. The composition of claim 1, wherein the zinc borate is a calcined zinc borate.

16. The composition of claim 15, wherein the calcined zinc borate has no water evolved when heated to 350 degrees Celsius.

17. The composition of claim 1, further comprising:
   d) more than 0 to about 10 percent by weight of a metal oxide selected from the group of: a titanium dioxide, a silicone dioxide, a zinc oxide, an antimony oxide, and combinations thereof.

18. The composition of claim 17, wherein the metal oxide has particle size of from about 0.1 to about 5 microns.

19. The composition of claim 1, wherein the composition has less than about 1000 ppm bromine and less than about 1000 ppm chlorine.

20. The composition of claim 1, further comprising:
e) a colorant selected from the group of: ultramarine blue, phthalo-blue, phthalo-green solvent green 3, solvent green 28, solvent green 50, solvent blue 28, solvent blue 29, solvent blue 36, solvent red 52, solvent red 101, solvent red 151, solvent orange 63, solvent violet 13, solvent violet 36, solvent yellow 33, solvent yellow 53, solvent yellow 98, pigment red 179, pigment red 202, pigment brown 24, pigment brown 33 pigment green 7, carbon black, pigment blue 15:4, and combinations thereof.

21. A method comprising:
forming a blend comprising:
  a) from about 99.6 to about 80.0 percent by weight silicone polyetherimide, wherein the silicone polyetherimide has from about 5 to about 50 percent by weight dimethyl siloxane units, and less than about 100 ppm amine end groups,
  b) from about 0.3 to about 5.0 percent by weight of a fibrillated polytetrafluoroethylene encapsulated in a component selected from the group of: a polystyrene, a polystyrene acrylonitrile), a poly(methyl methacrylate), a polycarbonate, a polyetherimide, a polysulfone, and combinations thereof, and
  c) more than 0 to about 10 percent by weight of a zinc borate;
mixing the blend to form an extrudate.

22. The method according to claim 21, wherein the blend is mixed in a twin screw extruder at a die head temperature of from about 300 to about 350 degrees Celsius.

23. The method according to claim 21, further comprising cooling, pelletizing, and drying the extrudate.

24. The method according to claim 21, further comprising processing the extrudate to form a product selected from the group of an injection molded product, a profile extruded product, a blow molded product, and combinations thereof.

25. An article comprising the composition of claim 1.

26. The article of claim 25, wherein the article is at least one selected from the group of an injection molded product, a profile extruded product, and a blow molded product.

27. The article of claim 25, wherein the article comprises a metal substrate, and a layer covering at least a portion of the substrate, wherein the layer comprises the composition according to claim 1.

28. The article of claim 27, wherein the substrate is a component of an armrest.

29. The article of claim 25, wherein the article is selected from the group of a tube, a profile, a housing for an injection molded product, a pipe, a conduit, and combinations thereof.

30. A flame retardant composition,
having a flame spread index as determined by ASTM E 162, on a 3.2 mm sample, of less than 35, and
having a tensile strength at yield as determined by ASTM D638, on a 3.2 mm sample at 50 mm/min crosshead speed, from 2,000 to 8,000 psi,
the flame retardant composition comprising:
  a) from about 99.6 to about 80.0 percent by weight silicone polyetherimide, wherein the silicone polyetherimide has from about 5 to about 50 percent by weight dimethyl siloxane units, a weight average molecular weight from about 5,000 to about 70,000 Daltons, and less than about 100 ppm amine end groups;
  b) more than about 1.25 to about 5.0 percent by weight of a fibrillated polytetrafluoroethylene encapsulated in a component selected from the group of: a polystyrene, a poly(styrene acrylonitrile), a poly(methyl methacrylate), a polycarbonate, a polyetherimide, a polysulfone, and combinations thereof;
  c) more than 0 to about 10 percent by weight of a zinc borate with a particle size of from about 1 to about 10 microns, having less than about 1000 ppm cadmium, mercury or lead;
  d) 0 to 5 wt % of a metal oxide selected from the group of; titanium dioxides, silicone dioxides, zinc oxides, antimony oxides or mixtures thereof, wherein the metal oxide has particle size of 0.1 to 5 microns; and
  e) less than 1000 ppm bromine or chlorine.

* * * * *